United States Patent
Uskela et al.

(10) Patent No.: US 6,980,512 B2
(45) Date of Patent: Dec. 27, 2005

(54) PACKET SWITCHING CONTROL SYSTEM AND METHOD

(75) Inventors: Sami Uskela, Espoo (FI); Markku Verkama, Espoo (FI); Jukka Wallenius, Espoo (FI); Serge Haumont, Espoo (FI)

(73) Assignee: Nokia Networks Oy, Espoo (FI)

( * ) Notice: Subject to any disclaimer, the term of this patent is extended or adjusted under 35 U.S.C. 154(b) by 744 days.

(21) Appl. No.: 09/840,410

(22) Filed: Apr. 23, 2001

(65) Prior Publication Data

US 2002/0012338 A1 Jan. 31, 2002

Related U.S. Application Data (63) Continuation of application No. PCT/EP98/06809, filed on Oct. 26, 1998.

(51) Int. Cl.[7] .................................................. H04J 1/16
(52) U.S. Cl. .................. 370/230; 370/252; 370/360; 709/228
(58) Field of Search ................. 370/252, 230, 370/235, 329, 347, 392, 429, 360, 386, 352–356, 400, 401, 328, 389; 709/228, 203; 379/88.17

(56) References Cited

U.S. PATENT DOCUMENTS

| | | | |
|---|---|---|---|
| 5,754,641 A | 5/1998 | Voit et al. ................ | 379/354 |
| 6,205,139 B1 * | 3/2001 | Voit ........................... | 370/389 |
| 6,295,292 B1 * | 9/2001 | Voit et al. ................ | 370/352 |
| 6,571,290 B2 * | 5/2003 | Selgas et al. ............. | 709/228 |

FOREIGN PATENT DOCUMENTS

| | | |
|---|---|---|
| EP | 0743777 A2 | 11/1996 |
| WO | WO 97/26739 | 7/1997 |
| WO | WO 98/32301 | 7/1998 |

OTHER PUBLICATIONS

International Search Report for PCT/EP98/06809.

* cited by examiner

*Primary Examiner*—John Pezzlo
(74) *Attorney, Agent, or Firm*—Squire, Sanders & Dempsey, L.L.P.

(57) ABSTRACT

A packet switching control system and method are described, for controlling a packet switched connection between a subscriber terminal and an end terminal identified by a connection endpoint identification in a communication network. A subscriber-specific screening list for a plurality of connection endpoint identifications is provided, wherein an subscriber-specific screening control of the packet switched connection is performed on the basis of the screening list. The screening list may contain detection point settings for an IN interrogation so as to provide an interworking function between the IN and the packet network. Moreover, the screening list may include a charging information to thereby define different charging parameters for packet connections to different connection endpoints. This enables the subscriber to define price limits for predetermined connections.

28 Claims, 4 Drawing Sheets

PACKET SWITCHING CONTROL SYSTEM AND METHOD

This application is a continuation of international application Serial Number PCT/EP98/06809, filed 26 Oct. 1998.

FIELD OF THE INVENTION

The present invention relates to a system and method for performing a packet switching control for data connections in a cellular network like a GPRS (General Packet Radio Services) network or a 3G network.

BACKGROUND OF THE INVENTION

Packet data connections are emerging in cellular networks in order to provide data transmissions with better resource utilizations. Due to the nature of the packet data traffic, especially in the Internet, users must be able to define different kinds of packet screenings. In GPRS, for example, the user has to pay for downlink packets he receives.

Moreover, it should be possible to charge a packet data traffic according to the connection endpoint identified by a connection endpoint identifier (CEI). This could be used for transmitting advertisements to a network user and charging the transmitting party instead of the user.

Furthermore, if an interworking function is to be established between a packet data network, like the IP network, and an Intelligent Network (IN), it would be desirable implementing an IN interrogation function. Such an IN interrogation function enables an implementation of subscriber-specific network services.

However, in data networks an IN interrogation cannot be triggered by each packet without triggering a huge amount of signaling.

SUMMARY OF THE INVENTION

It is an object of the present invention to provide a packet switching control system and method which enable a connection-specific packet switching control.

This object is achieved by a packet switching control system for controlling a packet switched connection between a subscriber terminal and an end terminal identified by a connection endpoint identification in a communication network, comprising:

storing means for storing a subscriber-specific screening list for a plurality of connection endpoint identifications; and control means for performing a screening control of the packet switched connection on the basis of a screening parameter corresponding to the connection endpoint identification of the end terminal, wherein the control means belongs to another entity than the storing means.

Furthermore, the above object is achieved by a packet switching control method for controlling a packet switched connection between a subscriber terminal and an end terminal identified by a connection endpoint identification in a communication network, comprising the steps of:

providing a subscriber-specific screening list for a plurality of connection endpoint identifications; and performing a screening control of the packet switched connection in another entity on the basis of a screening parameter corresponding to the connection endpoint identification of the end terminal.

Accordingly, by providing a subscriber-specific screening list for a plurality of packet data sources or destinations, each subscriber can define an individual kind of packet screening, so as to receive or transmit only desired data packets for which he has to pay. Moreover, the screening list may include a charging information to thereby define different charging parameters or rates for packet connections to different connection endpoints. This enables the subscriber to define price limits for predetermined connection, for example.

The connection endpoint identification preferably may be a PDP (Packet Data Protocol) address, an IP address, a subaddress space (i.e. an IP address prefix with a given arbitrary length), a port number, a DNS hostname and protocol, a cipherkey, or a combination of these (e.g. a screening for an E-mail is different from a screening for a web).

Based on the stored screening list, screening can be distributed between the network and the subscriber terminal.

Preferably, the control means is arranged to download the subscribe-specific screening list, when the subscriber terminal activates a packet data session.

The subscriber-specific screening list may be downloaded from an external server, such as an SCP (Service Control Point) or SDP (Service Data Point) of the GPRS network, or a location register, i.e. a Home Location Register (HLR) or a Visitor Location Register (VLR), during an attach or location update procedure performed in an SGSN (Serving GPRS Support Node). Alternatively, the screening list may be downloaded during a PDP context activation performed in a GGSN (gateway GPRS Support Node) of the GPRS, or after a first packet transmission.

Alternatively, the subscriber-specific screening list may be initialized as an empty list which is updated each time the a data packet with a connection endpoint identification not included in the subscriber-specific screening list is received. With such an update, a charging information for the particular connection could be transmitted.

The update of the subscriber-specific screening list may be performed by an inquiry to a service control function (SCF) which may be an external server (SCP) or an internal function (internal SCF), wherein the internal or external SCF further contacts a service data function (SDF), which in turn may be an external service data point (SDP) or an SDF in the same node as the SCF. The SCF may answer to the inquiry by transmitting a connection parameter for the corresponding connection endpoint identification.

The subscriber-specific screening list may comprise a tag indicating whether the list contains allowed or denied connection endpoint identifications, wherein only those data packets transmitted from/to an allowed connection endpoint are passed via the connection.

Furthermore, the subscriber-specific screening list may be propagated to other network elements, if it has been modified by a subscriber. Thereby, consistency of the screening list throughout the network can be assured.

Preferably, packet screening for downlink packets is performed by a network element, such as a Gateway GPRS Support node (GGSN) in the GPRS network, in accordance with the subscriber-specific screening list.

Furthermore, the above object is achieved by a subscriber terminal for controlling a packet switched connection to an end terminal identified by a connection endpoint identification in a communication network, comprising:

loading means for loading a subscriber-specific screening list; and control means for performing a packet screening for uplink packets on the basis of a screening list parameter corresponding to the connection endpoint identification of the end terminal. In particular, the subscriber terminal can be a mobile station equipment of a mobile communication network.

Thereby, the screening function can be distributed between the subscriber terminal and the network.

Alternatively, the network element may be arranged to monitor an uplink traffic transmitted from the subscriber terminal via the packet switched connection and to command the subscriber terminal to screen data packets transmitted to a packet destination identified as a denied packet destination based on said subscriber-specific screening list. Thereby, a complete handling of large screening lists in the subscriber terminal can be prevented, if the terminal has a limited memory capacity. Or alternatively, the screening for uplink data packets may be performed entirely by the SGSN or the GGSN.

In case the screening list comprises a charging information, the charging information may be supplied to a Serving GPRS Support Node (SGSN) of the GPRS network which performs a charging operation in accordance with the charging information. Or alternatively, if the screening is performed in the GGSN, the charging information can be incorporated by the GGSN into a CDR (Charging Detail Record) which is sent to a charging gateway.

Additionally, the above object is achieved by a packet switching control system for controlling a packet switched connection between a subscriber terminal and an end terminal identified by a connection endpoint identification in a communication network, comprising:

storing means for storing a subscriber-specific screening list for a plurality of connection endpoint identifications, wherein a detection point information for an interrogation of an Intelligent Network (IN) service control function can be set selectively for a specific connection endpoint identification in the subscriber-specific screening list; and control means for triggering an IN interrogation, when a data packet with a connection endpoint identification, for which a detection point information is set, is transmitted via the packet switched connection.

Furthermore, the above object is achieved by a packet switching control method for controlling a packet switched connection between a subscriber terminal and an end terminal identified by a connection endpoint identification in a communication network, comprising the steps of:

providing a subscriber-specific screening list for a plurality of connection endpoint identifications; selectively setting a detection point information for an interrogation of an Intelligent Network (IN) service control function for a specific connection endpoint identification in the subscriber-specific screening list; and triggering an IN interrogation, when a data packet with a connection endpoint identification, for which a detection point information is set, is transmitted via the packet switched connection.

This IN interrogation may include information such as the CEI, an identity of the MS (e.g. IMSI or PDP address), direction of transmission (mobile originated, mobile terminated). The subsequent IN response may indicate a new screening profile and eventually any action to take.

Accordingly, the screening profile of the data network is combined with the IN detection points. Such a logic combination enables a triggering of the IN interrogation only for predetermined data packets to thereby limit the amount of signalling. Thereby, a subscriber-specific service based on an IN interrogation readily can be implemented in packet data networks.

Preferably, the IN interrogation is triggered only for the first data packet having the connection endpoint identification marked with a DP (Detection Point). This largely reduces the amount of signaling.

Furthermore, the control means which has received a data packet to be transmitted to a packet destination marked in the subscriber-specific screening list with a detection point information, can be commanded to replace the corresponding DP information by an appropriate screening information and so to accept a data packet or to reject the data packet in accordance with the screening information. Thereby, the relationship between a detection point information and a connection endpoint information can be changed, if a web browser or the like changes a destination address, which might happen very often.

Furthermore, a more detailed subscriber-specific screening profile can be provided (downloaded) to the control means which has received a data packet to be transmitted to a packet destination marked with a detection point information in the subscriber-specific screening list. Thereby, addresses of a destination subnetwork can be further specified.

BRIEF DESCRIPTION OF THE DRAWINGS

In the following, the invention will be described in greater detail on the basis of a preferred embodiment with reference to the accompanying drawings.

DESCRIPTION OF THE PREFERRED EMBODIMENT

Figure 1:
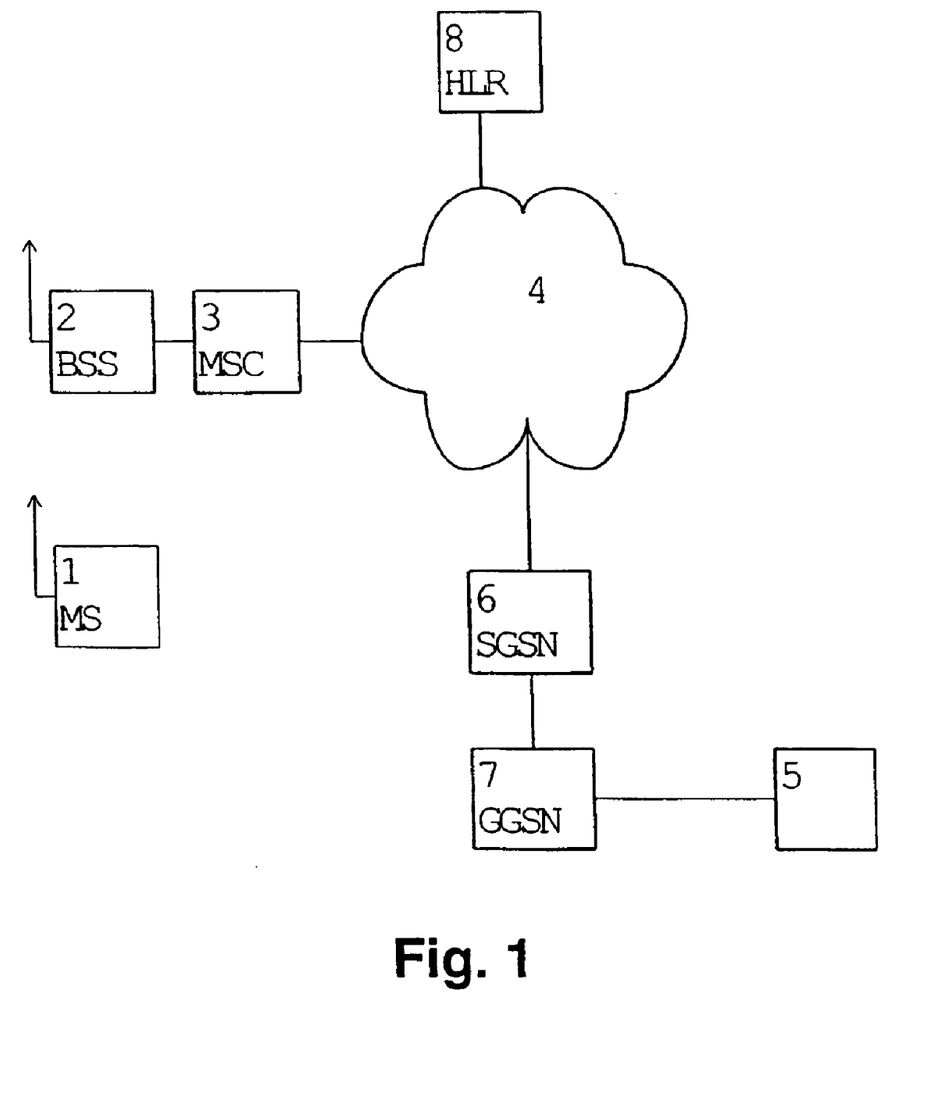
FIG. 1 shows a GPRS network in which the packet switching control system according to the present invention is employed.

In FIG. 1, a GPRS based on a GSM network 4 is shown, comprising a subscriber terminal such as a mobile station MS 1 which is radio-connected to a base station subsystem BSS 2. The BSS 2 is connected via a mobile switching center MSC 3 to the GSM network 4.

The GPRS is a service designed for digital cellular networks like GSM, DCS or PCS. It utilises a packet radio principle and can be used for carrying end user's packet data protocol (such as IP and X.25) information from/to a GPRS terminal to/from other GPRS terminals and/or external packet data networks.

GPRS uses a packet-mode technique to transfer high-speed and low-speed data and signaling in an efficient manner over the GSM radio network 4. Thus, GPRS optimises the use of network resources and radio resources. Moreover, GPRS does not require changes to the installed MSC 3.

GPRS introduces a Serving GPRS Support Node (SGSN) 6 and a Gateway GPRS Support Node (GGSN) 7 as two new network nodes in the GSM network 4.

The SGSN 6 is at the same hierarchical level as the MSC 3, keeps track of the individual location of the MS 1, and performs security functions and access control.

The GGSN provides an interworking function with an external packet-switched network to which an end terminal 5 such as typically a server or another terminal is connected, and is connected with the SGSN 6 via an IP-based GPRS backbone network.

Furthermore, a Home Location Register (HLR) 8 is provided which is enhanced with a GPRS subscriber information.

In order to access the GPRS services, the MS 1 activates the packet data address it wants to use. This operation makes the MS 1 known in the corresponding GGSN, and interworking with the end terminal 5 can commence.

According to the preferred embodiment, a packet data control is performed on the basis of a screening list which contains an information for identifying a plurality of connection endpoint identifiers (CEI) with a charging and screening information. The actual packet screening is performed in the subscriber terminal, i.e. the MS 1, for uplink packets and in the GGSN 7 for downlink packets. Thus, the screening is performed before the packets are transmitted over the air interface, such that the best gain is achieved from the screening, since the subscriber or user has to pay for both uplink and downlink packets.

Since the screening list may become too large to be handled completely in the limited memory of the MS 1, the GGSN 7 may perform screening for most of the uplink packets, too.

While the GGSN 7 first takes care of all screening for both the uplink and the downlink packets, it monitors the uplink traffic. If the GGSN 7 notifies frequent tries of the MS 1 to send uplink packets to a denied packet destination, the GGSN 7 may send a command to the MS 1 to screen packets sent to the packet destination in question. If the memory resources of the MS 1 for the screening information are about to be filled, the MS 1 may delete the least used entries from its screening list.

In addition to the screening, the GGSN 7 may perform charging according the information provided in the screening list. As the SGSN 6 performs charging, the GGSN 7 sends the charging information provided on the screening list to the SGSN 6. As an example, the screening list may indicate that the traffic to an address "www.service provider.com" is free of charge for the specific user, but charged from the site owner instead.

When the user activates a packet data session, the GGSN 7 initializes a screening list for the user at the PDP context activation. In the following, two different screening control procedures performed by the GGSN 7 are described with reference to FIGS. 2 and 3.

Figure 2:
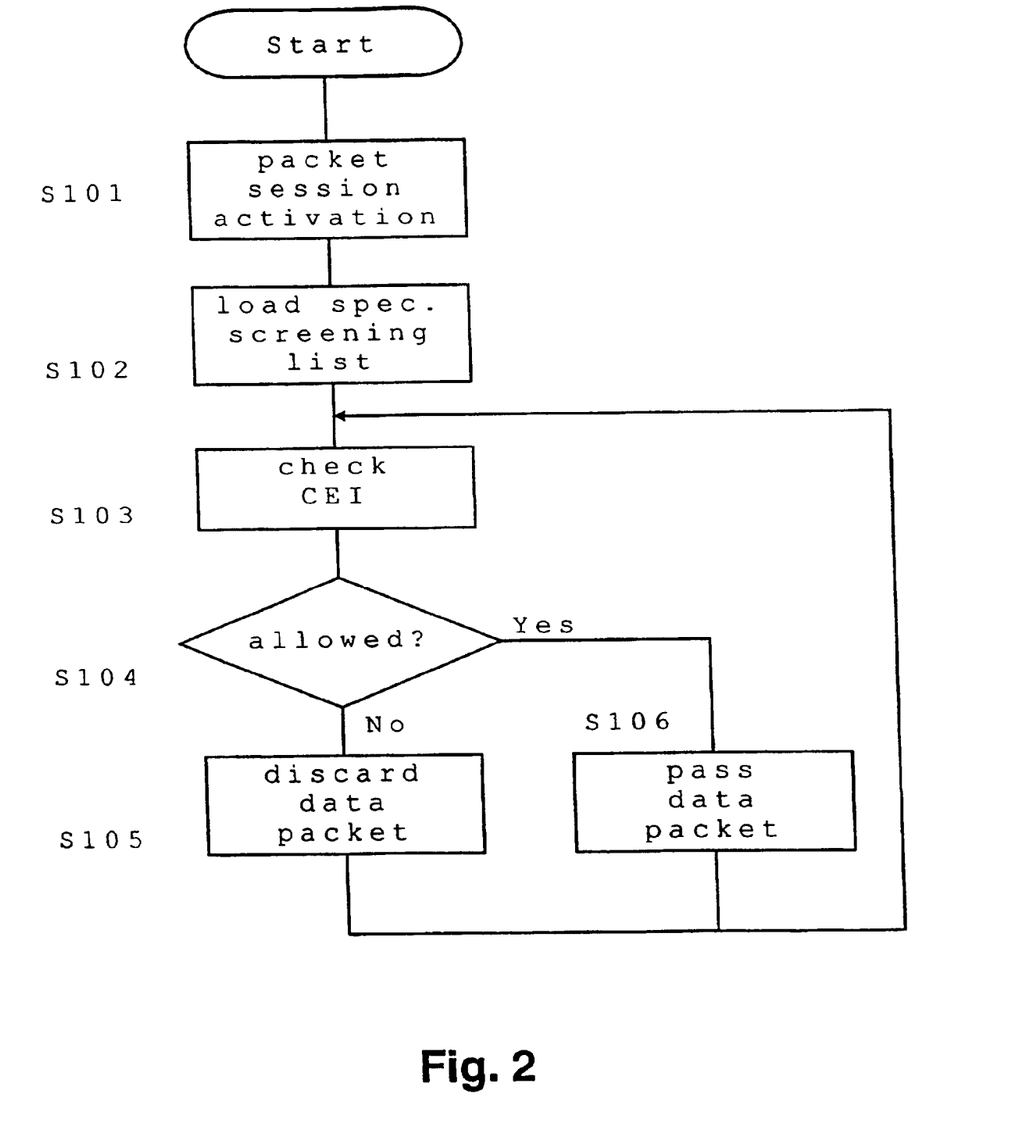
FIG. 2 shows a flow diagram of a packet switching control method according to the present invention based on a static screening list.

FIG. 2 shows a flow diagram of a control procedure based on a static, subscriber-specific (user-specific) screening list which may comprise an information about allowed or denied end terminals 5 identified by connection endpoint identifiers (CEI).

In step 101, the MS 1 activates a data session by a packet session activation procedure. Subsequently, the GGSN 7 loads the specific screening list of the subscriber (user) in step S102. The list can be loaded from a Service Control Point (SCP) or an SDP during the GPRS attach procedure, a location update procedure or the PDP context activation. As an alternative, the screening list could be downloaded from the HLR 8 or a Visitor Location Register (VLR) together with other subscriber data.

Thereafter, in step 103, the GGSN 7 checks the CEI of a received data packet. In case it is determined in step S104 that the CEI is an allowed one, the GGSN 7 passes the data packet (step S105). Otherwise, the GGSN 7 discards the data packet. Then, the procedure returns to step S103 and the CEI of the next data packet is checked.

The screening list may have tag which reveals whether the list contains the allowed or the denied CEIs. If the tag indicates that the CEIs in the list are the allowed ones, only packets from/to the sources/destinations of the CEIs in the list are permitted to go through, i.e. are passed. In the opposite case, the packets from/to the sources/destinations of the CEIs in the list are discarded. Naturally, the screening information of a "from" CEI may differ from that of a "to" CEI.

The CEIs can be packet data CEIs, i.e. IP addresses, subaddress spaces (i.e. an IP address prefix of a given arbitrary length), and port numbers, or some other information which identifies the packet source or destination 5. The other information might be a DNS hostname and protocols or cipherkeys, which are used with e.g. IPSEC to authenticate the packet source or destination 5. Using a cryptographic authentication method protects the system against attacks like IP spoofing, DNS spoofing, man-in-the-middle attacks, etc. In particular, when charging is concerned, strong authentication is required.

In addition to the screening information, the list may contain additional information elements used for charging, for instance. The CEI-based charging information stored in the list allows distinct charging for different packet sources and destinations. For example, a communication with a specific WWW site could be charged from the site owner instead of the user.

In the GPRS, the charging bill is determined in a billing system depending on call detail records (CDRs) received from the GGSN and the SGSN via a charging gateway. The billing is calculated from parameters included in the CDRs, e.g. amount of data transmitted, activation time of an NM context or a PDP context, amount of data transmitted with a given QoS (Quality of Service).

Accordingly, the CEI-based charging information may comprise a free packet indicator or an alternative charging indicator, which are included in the CDRs transmitted to the billing system via the charging gateway. In this case, the CDRs could include a separate entry on the amount of data transmitted with the free packet indicator or the alternative charging indicator. If the alternative charging indicator is set then also an information element identifying the party to be charged must be provided. Such an information element must be sufficient to unambiguously address the billed party. The actual contexts of the information element can be transparent for GPRS nodes, wherein the format and the contents of the information element may be bilaterally agreed between the provider of the screening list, e.g. the SCF, and the billing system or the charging gateway of the GPRS network.

Since it must be possible for the subscriber to modify his screening list, the SCP must propagate the modified screening list to appropriate network elements so as to retain consistency of the list. The list can be modified with a WWW browser based solution.

Figure 3:
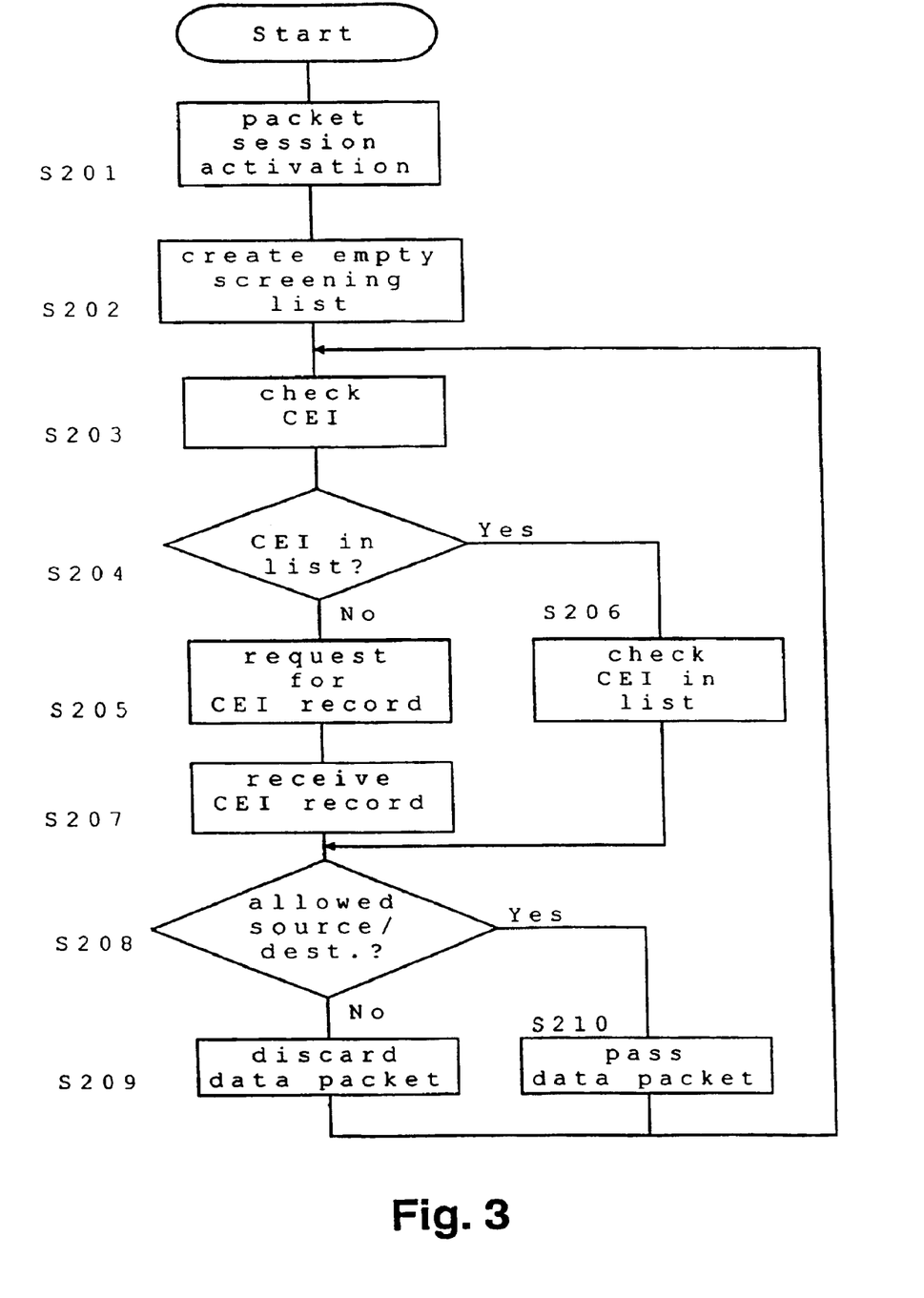
FIG. 3 shows a flow diagram of a packet switching control method according to the present invention based on a dynamic screening list.

FIG. 3 shows a flow diagram of a control procedure based on a dynamic, subscriber-specific (user-specific) screening list which the GGSN 7 learns during packet data sessions.

After the initial packet session activation procedure in step S201, the GGSN 7 creates an empty screening list for the user in step S202. This means that a detection point is set for all CEI (e.g. all IP addresses→*.*.*.*). When the GGSN 7 receives a data packet, it checks the CEI thereof (step 203). In case the GGSN 7 determines in step S204 that the CEI is not yet in the screening list, it performs a request (inquiry) for a CEI record to the SCF which may be an external server (SCP) or an internal function (internal SCF) (step S205). The SCF replies by sending a record for the CEI, which contains the corresponding screening information and which is received by the GGSN 7 in step S207. The GGSN 7 stores the record in its dynamic screening list for future reference. Thus, the screening list is learned CEI by CEI.

In case the GGSN 7 determines in step S204 that the CEI is already stored in the dynamic screening list, it checks the screening information of the CEI as in step S103 of FIG. 2.

The following processing in steps S208 to S210 corresponds to the processing in steps S104 to S106 of FIG. 2.

The above control procedure based on the dynamic screening list leads to a significant delay, when the first packet from/to the source/destination of the CEI arrives at the GGSN 7. On the other hand, the packet data traffic tends to be asynchronous and there are similar delay variations in the Internet. Moreover, if the user communicates with several hosts, e.g. WWW surfing, there will be a huge amount of inquiries to the SCP. Also in this scenario, the SCP has to propagate the modified list to appropriate network elements so as to retain consistency of the list.

Figure 4:
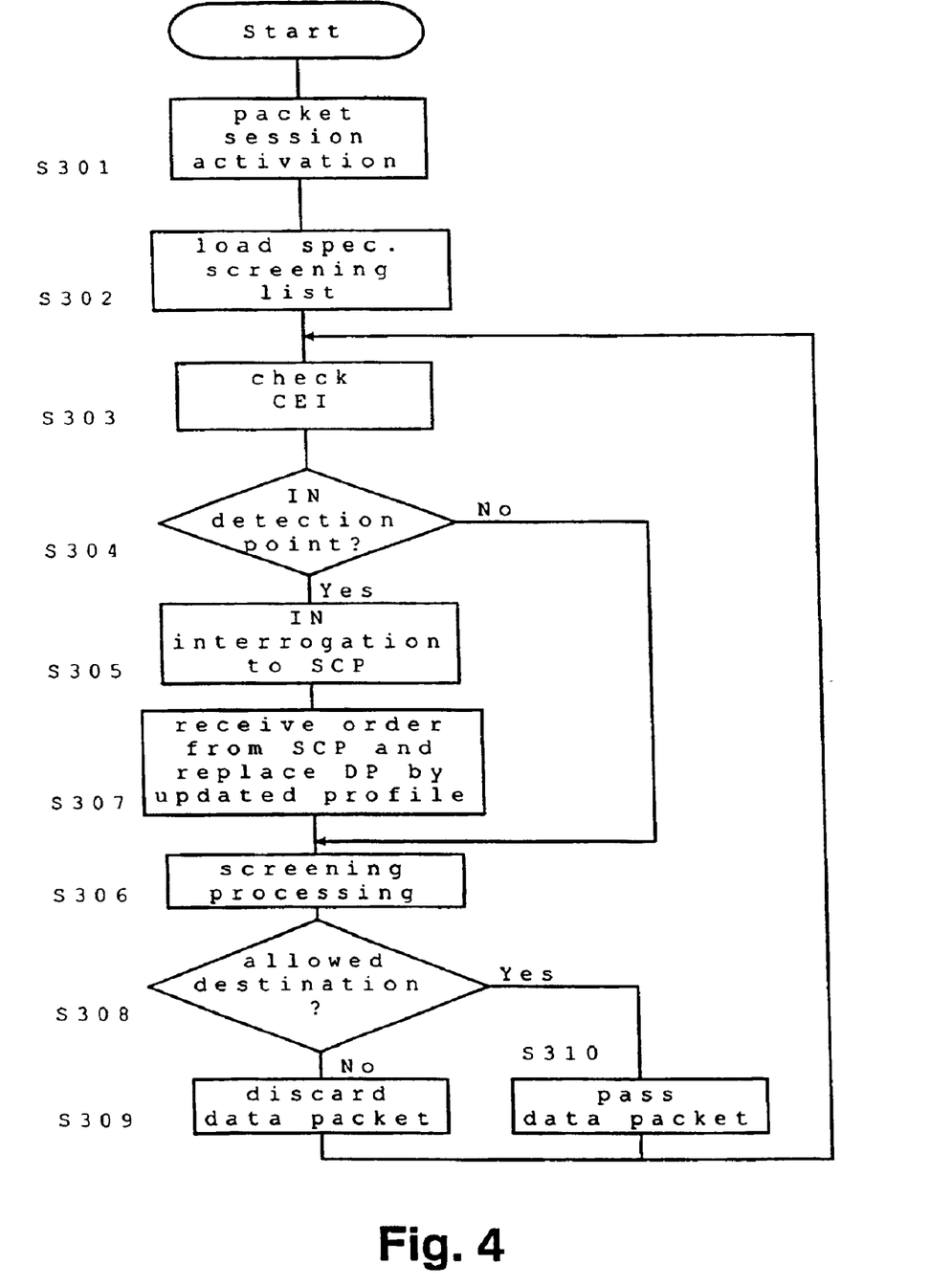
FIG. 4 shows a flow diagram of an IN based packet switching control method according to the present invention.

In the following a switching control procedure which enables an implementation of an IN interrogation in the GPRS data network 4 is described.

In order to limit the amount of signaling, the IN interrogation is triggered only for the first data packet addressed to a new address, i.e. CEI. However, in case of IP, a web browser changes a destination address of a data packet very often. Therefore, the detection point is incorporated in the screening function, wherein the detection point might be set for an address or a subnetwork comprising a plurality of addresses.

According to the preferred embodiment, detection points for the IN interrogation procedure are logically combined with the screening profile, i.e. screening list, provided in the network 4. An example for such a screening profile could be:

| Packet sent to: | 123.*.*.* | → | allowed |
| | 111.*.*.* | → | forbidden |
| | 132.*.*.* | → | detection point |

According to the above example, data packets sent to addresses starting with 123.*.*.* are passed, and those sent to addresses starting with 111.*.*.* are discarded, which corresponds to the above described screening processing. However, for those sent to addresses starting with 132.*.*.* an IN interrogation processing is performed.

FIG. 4 shows a flow diagram of a switching control procedure comprising the above IN interrogation processing.

In steps S301 to S303, a processing similar to steps S101 to 103 of FIG. 2 is performed. However, the processing might as well be based on a dynamic screening list according to the flow diagram depicted in FIG. 3. In step S304, the GGSN 7 determines whether an IN detection point is set for the CEI (address) of a received data packet. In case no detection point is set, the screening processing as described in connection with FIG. 2 or 3 is performed in step S306.

In case a detection point is set for the received CEI, the GGSN 7 sends an IN interrogation including the corresponding CEI information (e.g. source and destination address) and an additional information like a subscriber identity to the SCP (step S305). Subsequently, the SCP sends an order message to the GGSN 7, received in step S307. In the order message, the SCP commands the GGSN 7 to replace the DP with a subscriber-specific screening profile with a finer granularity. Based on this new screening profile, the GGSN 7 decides to accept the data packet (allowed destination) or to reject the data packet (denied destination). In this respect, it should be noted that this new screening profile may still contain other DPs (e.g. 132.21.*.*=DP).

Thus, in case the GGSN 7 determines an allowed destination in step S308, the data packet is passed in step S310. Thereby, it is ensured that the IN interrogation is restricted to the first data packet of a new CEI. In case of a denied destination, the GGSN 7 discards the data packet. Subsequently, the procedure returns to step S303, where the next data packet is checked.

The above example could be of particular interest, if there are different screening profiles for different applications. In this case, the CEI can be a combination of a port number (linked to the application) and a source address (for a subscriber terminated packet) or a destination address (for a subscriber originated packet).

When a first packet is sent from a WEB session, the IN interrogation is triggered and the screening profile for the WEB session is downloaded in the GGSN 7. If the user starts an FTP session thereafter, a DP will be triggered and the whole screening profile for the FTP session is downloaded. However, the screening profile for other applications will not be downloaded if these applications are not used. Therefore, this example could be used for designing a system where screening profiles are downloaded as needed.

In addition to the above processing, the SCP may command a specific action, such as modification of the charging record, disconnection of the user, tracing the user or other actions.

In case the detection point was set to a plurality of addresses having an identical address component as in the above example, the SCP might send a new, more detailed screening list, for example:

| 132.112.435.12 | → | allowed |
| 132.112.44.* | → | forbidden |
| ... | | |

Moreover, a default setting could be established, wherein all packets sent to a destination for the first time are accepted, or wherein a detection point is set for all downlink packets coming from an unknown address. In this case, the subscriber-specific screening list only has to be downloaded, when it is required.

By the above described IN interrogation processing, a possible way for the IN to interwork with a packet data network like IP is given. Moreover, the detection point could be combined in a firewall functionality implemented in the GGSN 7 or a router.

In summary, a packet switching control system and method are described, for controlling a packet switched connection between a subscriber terminal and an end terminal identified by a connection endpoint identification in a communication network. A subscriber-specific screening list for a plurality of connection endpoint identifications is provided, wherein an subscriber-specific screening control of the packet switched connection is performed on the basis of the screening list. The screening list may contain detection point settings for an IN interrogation so as to provide an interworking function between the IN and the packet network. Moreover, the screening list may include a charging information to thereby define different charging parameters for packet connections to different connection endpoints. This enables the subscriber to define price limits for predetermined connections.

It should be understood that the above description and the accompanying figure are only intended to illustrate the present invention. Thus, the method and system according to the invention may also be used in systems other than the described GPRS system. In particular, the method and system could be applied in non-cellular systems such as the Internet. The preferred embodiment of the invention may vary within the scope of the attached claims.

What is claimed is:

1. A packet switching control system for controlling a packet switched connection between a subscriber terminal (1) and an end terminal (5) identified by a connection endpoint identification in a communication network (4), comprising:
   storing means for storing a subscriber-specific screening list for a plurality of connection endpoint identifications;
   control means (7) for performing a screening control of the packet switched connection on the basis of a screening parameter corresponding to the connection endpoint identification of the end terminal (5), wherein said control means (7) belongs to a different entity than said storing means; and
   screening means for performing a screening process, using the screening list, for each packet wherein a connection endpoint identifier (CEI) of each packet is checked as to allowed destination, and packets are passed when the destination is allowed whereas data packets from/to unallowed destinations are discarded.

2. A system according to claim 1, wherein said control means (7) belongs to any entity where a packet session is activated, while said storing means belongs to a fixed entity.

3. A system according to claim 1, wherein the control means (7) is arranged to download the subscriber-specific screening list, when the subscriber terminal (1) activates a packet data session.

4. A system according to claim 3, wherein the control means (7) is arranged to download the subscriber-specific screening list, when a packet is transmitted.

5. A system according to claim 3, wherein the control means (7) is arranged to load the subscriber-specific screening list from an external server or a location register (8) during an attach or location update procedure or a PDP context activation, and to store the loaded screening list in the storing means.

6. A system according to claim 5, wherein the subscriber-specific screening list comprises a tag indicating whether the list contains allowed or denied connection endpoint identifications, and wherein the control means (7) is arranged to let pass only those data packets transmitted from/to an allowed connection endpoint.

7. A racket switching control system for controlling a packet switched connection between a subscriber terminal (1) and an end terminal (5) identified by a connection endpoint identification in a communication network (4), comprising:
   storing means for storing a subscriber-specific screening list for a plurality of connection endpoint identifications; and
   control means (7) for performing a screening control of the packet switched connection on the basis of a screening parameter corresponding to the connection endpoint identification of the end terminal (5), wherein said control means (7) belongs to a different entity than said storing means; and
   wherein the subscriber-specific screening list is initialized as an empty list which is updated by the control means (7) each time the control means (7) receives a data packet with the connection endpoint identification not included in the subscriber-specific screening list.

8. A system according to claim 7, wherein the update of the subscriber-specific screening list is performed by an inquiry to a service control function which answers to the inquiry by transmitting a connection parameter for the connection endpoint identification.

9. A system according to claim 3, wherein the subscriber-specific screening list is propagated to other network elements, if it is has been modified by a subscriber.

10. A system according to claim 1, wherein said control means (7) is a network element and arranged to perform packet screening for downlink packets in accordance with the subscriber-specific screening list.

11. A system according to claim 10, wherein said network element (7) is arranged to monitor an uplink traffic transmitted from the subscriber terminal (1) via the packet switched connection and to command the subscriber terminal (1) to screen data packets transmitted to an end terminal (5) identified as a denied packet destination based on said subscriber-specific screening list.

12. A system according to claim 10, wherein the communication network (4) is a General Packet Radio Services (GPRS) network and wherein the network element is a Gateway GPRS Support Node (GGSN) (7).

13. A system according to claim 12, wherein the screening list comprises a charging information, and wherein the GGSN (7) is arranged to supply the charging information to a Serving GPRS Support Node (SGSN) (6) which performs a charging operation in accordance with the charging information.

14. A system according to claim 1, wherein the connection endpoint identification is one of a PDP address, an IP address, a subaddress space, a port number, a DNS hostname and protocol, a cipherkey or a combination of these.

15. A subscriber terminal (1) for controlling a packet switched connection to an end terminal (5) identified by a connection endpoint identification in a communication network (4), comprising:
   loading means for loading a subscriber-specific screening list;
   control means (7) for performing a packet screening for uplink packets on the basis of a screening list parameter corresponding to the connection endpoint identification of the end terminal (5); and
   screening means for performing a screening process, using the screening list, for each packet wherein a connection endpoint identifier (CEI) of each packet is checked as to allowed destination, and packets are passed when the destination is allowed whereas data packets from/to unallowed destinations are discarded.

16. A subscriber terminal according to claim 15, wherein said subscriber terminal is a mobile station equipment.

17. A packet switching control system for controlling a packet switched connection between a subscriber terminal (1) and an end terminal (5) identified by a connection endpoint identification in a communication network (4), comprising:

storing means for storing a subscriber-specific screening list for a plurality of connection endpoint identifications, wherein a detection point information for an interrogation of an Intelligent Network (IN) service control function can be set selectively for a specific connection endpoint identification in the subscriber-specific screening list;

control means (7) for triggering an IN interrogation, when a data packet with a connection endpoint identification, for which a detection point information is set, is transmitted via the packet switched connection; and screening means for performing a screening process, using the screening list, for each packet wherein a connection endpoint identifier (CEI) of each packet is checked as to allowed destination, and packets are passed when the destination is allowed whereas data rackets from/to unallowed destinations are discarded.

18. A system according to claim 17, wherein the IN interrogation is triggered only for a first data packet having a new connection endpoint identification marked with a detection point.

19. A system according to claim 17, wherein the control means (7) is commanded by the service control function, which has received the IN interrogation, so as to replace the corresponding detection point information by a subscriber-specific screening information, and so to accept a data packet or to reject the data packet in accordance with the subscriber-specific screening information.

20. A system according to claim 19, wherein the service control function which has received the IN interrogation provides a more detailed subscriber-specific screening profile to the control means (7).

21. A packet switching control method for controlling a packet switched connection between a subscriber terminal (1) and an end terminal (5) identified by a connection endpoint identification in a communication network (4), comprising the steps of:

providing a subscriber-specific screening list for a plurality of connection endpoint identifications;

performing a screening control of the packet switched connection in another entity on the basis of a screening parameter corresponding to the connection endpoint identification of the end terminal (5); and performing a screening process, using the screening list, for each packet wherein a connection endpoint identifier (CEI) of each packet is checked as to allowed destination, and packets are passed when the destination is allowed whereas data packets from/to unallowed destinations are discarded.

22. A method according to claim 21, wherein the subscriber-specific screening list is loaded from an external server or a location register (8) during an attach or location update procedure or a PDP context activation.

23. A method according to claim 21, wherein the subscriber-specific screening list is initialized as an empty list and updated each time a data packet with a connection endpoint identification not included in the subscriber-specific screening list is received.

24. A method according to claim 21, further comprising the step of propagating the subscriber-specific screening list to other network elements, if it is has been modified by a subscriber.

25. A method according to claim 21, wherein the screening control is performed in a network element for downlink packets and in the subscriber terminal for uplink packets.

26. A method according to claim 21, wherein an uplink traffic transmitted from the subscriber terminal via the packet switched connection is monitored and the subscriber terminal is commanded to screen data packets transmitted to a packet destination identified as a denied packet destination based on said subscriber-specific screening list.

27. A method according to claim 21, wherein the screening list comprises a charging information.

28. A packet switching control method for controlling a packet switched connection between a subscriber terminal (1) and an end terminal (5) identified by a connection endpoint identification in a communication network (4), comprising the steps of:

providing a subscriber-specific screening list for a plurality of connection endpoint identifications;

selectively setting a detection point information for an interrogation of an Intelligent Network (IN) service control function for a specific connection endpoint identification in the subscriber-specific screening list;

triggering an IN interrogation, when a data packet with a connection endpoint identification, for which a detection point information is set, is transmitted via the packet switched connection; and performing a screening process, using the screening list, for each packet wherein a connection endpoint identifier (CEI) of each packet is checked as to allowed destination, and packets are passed when the destination is allowed whereas data packets from/to unallowed destinations are discarded.

* * * * *